United States Patent [19]

Lapeyre

[11] 4,376,394
[45] Mar. 15, 1983

[54] MANUALLY OPERABLE MULTI-SPEED BICYCLE TRANSMISSION

[76] Inventor: Fernand S. Lapeyre, 1224 Octavia St., New Orleans, La.

[21] Appl. No.: 234,427

[22] Filed: Feb. 13, 1981

Related U.S. Application Data

[63] Continuation-in-part of Ser. No. 968,989, Dec. 13, 1978, Pat. No. 4,305,312.

[51] Int. Cl.³ ............................................. F16H 3/44
[52] U.S. Cl. ................................... 74/750 B; 192/6 A
[58] Field of Search ...................... 74/750 B; 192/6 A

[56] References Cited

U.S. PATENT DOCUMENTS

3,766,805  10/1973  Shea et al. .................. 74/750 B X
3,842,691  10/1974  Shea .......................... 74/750 B X
4,059,028  11/1977  Schulz et al. ................ 74/750 B X
4,147,244   4/1979  Segawa et al. ............... 74/750 B X Primary Examiner—Rodney H. Bonck
Assistant Examiner—Frank H. McKenzie, Jr.
Attorney, Agent, or Firm—Nims, Howes, Collison & Isner

[57] ABSTRACT

A multi-speed bicycle transmission located at the drive pedal hub and manually actuatable shifting assembly therefor. The shifting assembly further includes a slidable collar mounted on and rotatable in conjunction with the drive pedal shaft within the drive pedal hub having camming means thereon engageable by pivotably displaceable shift pin means extending into the pedal hub to effect selective manually induced longitudinal displacement of said collar on the drive pedal shaft and an accompanying shifting of the gears in response thereto.

8 Claims, 13 Drawing Figures

MANUALLY OPERABLE MULTI-SPEED BICYCLE TRANSMISSION

This application is a continuation in part by my copending application Ser. No. 968,989 filed Dec. 13, 1978 now U.S. Pat. No. 4,305,312.

This invention relates to multi-speed bicycle transmissions and more particularly to an improved, pedal hub located and manually actuatable multi-speed bicycle transmission system for racing bicycles and the like.

Although bicycles have been widely used for a long period of time, recent years have witnessed a widespread increase in the popularity of bicycling as a healthful and enjoyable recreational activity, as well as a renewed awareness of their utility as an inexpensive means of individualized local transportation and an expanding area of competitive endeavor, such as bicycle racing. As a concommitant thereto, there has been a renewed emphasis on the utilization of multi-speed transmission systems for bicycles to enhance their operational efficiency over various types of terrain and to accommodate the ever expanding differences in the state of physical conditioning and capabilities of the users thereof. Although the patented art is replete with many different types of suggested multi-speed transmission systems, economic realities and practical considerations have apparently limited widespread commercial usage to two, three and five speed transmissions located within the rear wheel hub and to the widely utilized ten speed transmissions of the "derailleur" type, all of which are normally operable in response to a cable connected and manually manipulatable shift lever and which require a hand operated brake system. Also used, but to a lesser extent, are the more complicated drive pedal manipulative types of rear wheel hub multi-speed transmissions that are compatible with coaster brake drive systems, as for example, the Fichtel and Sachs AG "Torpedo" transmissions.

Among the many suggested bicycle transmission systems disclosed in the patented art are numerous disclosures of coaster brake compatible, rear wheel hub transmissions activated by reverse drive pedal rotation, as exemplified by the patents of Schwerdhofer (for example—U.S. Pat. Nos. 3,648,809, 3,270,589, 3,200,699, 3,180,181, 3,147,641); Hood (for example—U.S. Pat. Nos. 3,022,682, 2,993,575, 2,982,384, 3,972,908, 2,940,339) and Gleasman (for example—U.S. Pat. Nos. 3,354,750, 2,993,389, 2,903,913, 2,914,152). Other suggested and exemplary expedients for rear wheel hub transmission systems include reverse drive pedal actuatable epicyclic gear systems as disclosed in U.S. Pat. Nos. 3,351,165, 3,433,097, 3,803,947 and 3,726,156 and manually selectable rear wheel hub transmissions as embodied in U.S. Pat. Nos. 3,653,273 and 3,886,811.

Rear wheel hub multi-speed transmission systems, and particularly those that are coaster brake compatible, are of relatively complicated construction with diminutively sized components dictated by the limited available space. As such and because of the wheel diameter lever arm inherent in rear wheel hub located multi-speed transmissions, such are unduly subject to damage through normal, much less abusive, use and the repair thereof is usually both relatively difficult and expensive. Even the simpler rear wheel hub multi-speed transmission systems that are widely employed in hand brakeable bicycles, such as the Sturmey-Archer three speed and "derailleur" type multi-speed transmissions, are subject to hub component and gear shift cable damage that necessitate relatively expensive repairs.

Recent years have witnessed a refocussing of attention upon the drive pedal hub as a suitable situs for multi-speed transmission components for bicycles. One suggested expedient includes the utilization of a manually responsive planetary gear system adjacent to the drive pedal hub that is compatible with a rear wheel hub coaster brake assembly. Such a suggested construction is disclosed in the Shea U.S. Pat. Nos. 3,727,484, 3,766,805 and 3,842,691. Other suggested expedients include impact responsive shifting mechanisms, and manually controllable variations in the main drive pedal sprocket diameter. Illustrative of such expedients are U.S. Pat. Nos. 2,600,586, 1,608,141 and 3,506,100 and various publications such as *Design News* of Dec. 16, 1974 (pp. 46-7) and *Product Engineering* of June 1973 (p. 13).

BRIEF DESCRIPTION OF THE INVENTION

This invention may be briefly described as an improved manually selectable multi-speed bicycle transmission located at the drive pedal hub operable under all conditions of cycle operation from zero to maximum attainable speed. In certain aspects the subject invention may be viewed as a novel and improved transmission system of the general in-line type disclosed in U.S. Pat. No. 3,812,735. In its broader aspects, the subject invention includes a self-contained, drive pedal hub located, in-line type multi-speed transmission wherein a plurality of change speed gears are journalled on the pedal drive shaft and are in constant running engagement with corresponding companion gears and wherein a shifting mechanism responsive to the positioning of a manually displaceable collar on the drive pedal shaft disposed within the drive pedal hub is selectively operable to couple individual change speed gears in driving engagement to the pedal drive shaft to provide a plurality of preselectable and different transmission ratios for the main pedal drive sprocket. In its narrower aspects, the subject invention includes a pedal hub located transmission therein upshifting and downshifting is effected, in the absence of driving stresses, by manual manipulation of a shift lever independent of drive pedal shaft rotation and wherein the driving interconnections between the drive gears and the pedal drive shaft is effected by members subjected only to compressive stress under drive conditions.

As indicated above, this application is a continuation in part of my copending application Ser. No. 968,989 filed Dec. 13, 1978 which in turn was a continuation in part of application Ser. No. 810,112 filed June 27, 1977 now abandoned. In both of the aforementioned applications shifting was effected by selective reverse rotation of the pedal drive shaft at a pair of preselected locations in the normal path of rotative displacement thereof. This application, which is directed to a multi-speed transmission primarily intended for use in racing bicycles and the like and where forward drive pedal rotation is desirably uninterrupted, differs essentially from the construction described in the aforesaid applications in that shifting is effected other than by reverse pedal rotation.

Among the manifold advantages of the subject invention is the provision of an improved multi-speed bicycle transmission that may be used alone with hand brakeable bicycles in accord with the desires and dictates of the rider and which may be compatibly employed in association with existing hand brakeable, gear shift operated and coaster brake incompatible multi-speed rear wheel hub transmissions, such as the widely employed Sturmey-Archer three speed transmissions, to conveniently provide an expanded number of available transmission ratios. Further advantages include the provision of an in-line transmission locatable at the drive pedal hub, wherein the stress magnitudes on the shifting and drive components are relatively small, wherein the gears may be readily interchanged to modify the gear ratios whenever required. Another advantage includes the general provision of an in-line multi-speed transmission wherein the critically stressed drive system components, such as the interconnection of the drive gears with the drive shaft, are subjected only to compressive stresses when drivingly engaged. Other advantages include the provision of a factory assembled and sealed in-line type of multi-speed transmission for bicycles of rugged and durable character that affords a long operating life and singular freedom from maintenance and repair. Further advantages include the capability of shifting gears without effective interruption of drive pedal rotation and concomitant application of driving power. Still other advantages include the provision of an improved multi-speed bicycle transmission of the in-line type where shifting can be effected independent of the speed of the bicycle including while at rest and wherein one set of gears, even during the shifting operation, is always drivingly engaged. Still further advantages of the subject invention include the provision of a reliable and economic in-line type of multi-speed transmission for bicycles that is effectively immune to damage arising from any pedal manipulation.

The primary object of this invention is the provision of an improved multi-speed transmission for racing bicycles and the like.

Another primary object of this invention is the provision of a pedal hub locatable and manually shiftable multi-speed bicycle transmission of improved character.

Still another primary object of the invention is the provision of an improved in-line multi-speed transmission construction for racing bicycles and the like wherein the driving interconnection between the drive gears and the drive shaft is effected by members subjected only to compressive stress under drive conditions.

A still further object of this invention is the provision of an improved manually operable and pedal hub located multi-speed bicycle transmission that can be used alone in hand brakeable bicycles or in association with coaster brake incompatible rear wheel hub transmissions to inexpensively provide an expanded number of available gear ratios.

Other objects and advantages of the subject invention will become apparent from the following portions of this specification and from the appended drawings which illustrate, in accord with the mandate of the patent statutes, a presently preferred drive pedal operable multi-speed bicycle transmission construction incorporating the principles of this invention.

BRIEF DESCRIPTION OF THE DRAWINGS

Referring to the drawings.

DETAILED DESCRIPTION OF THE INVENTION

Figure 1:
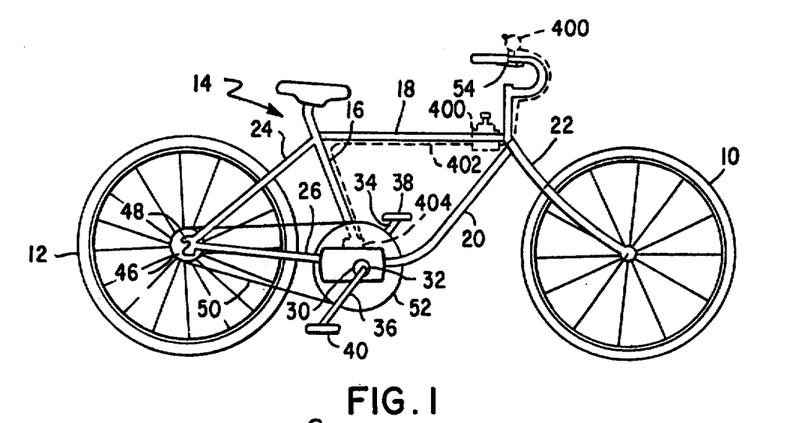
FIG. 1 is a schematic side elevational view of a bicycle constructed in accord with the principles of the invention.

Referring to the drawings and initially to FIG. 1, there is provided a bicycle having a front steerable wheel 10 and a rear driving wheel 12 mounted on a frame, generally designated 14. The frame 14 is of conventional tubular construction and generally includes a substantially vertical seat post member 16, a horizontal upper member 18, an angularly disposed lower member 20, a bifurcated front wheel support 22, a bifurcated rear wheel support 24 and a pair of rearwardly extending lower members 26. The seat post member 16, lower member 20 and rearwardly extending lower members 26 commonly terminate at a transverse cylindrical pedal drive shaft hub, generally designated 30, which, as will hereinafter be desribed, forms a portion of the housing for the improved multi-speed transmission system incorporating the principles of this invention. For introductory explanatory purposes, however, such bicycle also includes a transversely disposed drive pedal shaft 32 journalled in the hub 30 having conventional opposed left and right pedal cranks 34 and 36 terminally mounted thereon. Rotatably mounted at the terminal ends of the cranks 34 and 36 are independently rotatable drive pedals 38 and 40 respectively. For clarity of description herein, the terms "right" and "left" will accord with the right and left sides of the bicycle rider as he would normally use the bicycle. The rear or drive wheel 12 includes a hub 46 and sprocket 48 drivingly connected by a chain 50 to the main drive sprocket 52 mounted on the right side of hub 30. The sprocket 52 is positively driven, through the hereinafter described transmission, by rotation of the pedal cranks 34 and 36 in the clockwise direction as viewed from the right. Hand levers 54 are mounted on the handle bars for actuation of conventional wheel rim brake pads.

As indicated by the dotted lines, a manually operable gear shift lever assembly 400, of the type conventionally employed in Sturmey-Archer or "derailleur" rear wheel transmission systems is mounted either on the handle bars or on the forward end of the upper frame member 18 in convenient location for manual manipulation by the rider. Extending from the shift lever assembly is a sheathed cable 402 terminating in a shift assembly, schematically designated by the rectangle 404 on the seat post frame member 16 immediately above its point of juncture with the pedal hub 30.

Figure 2:
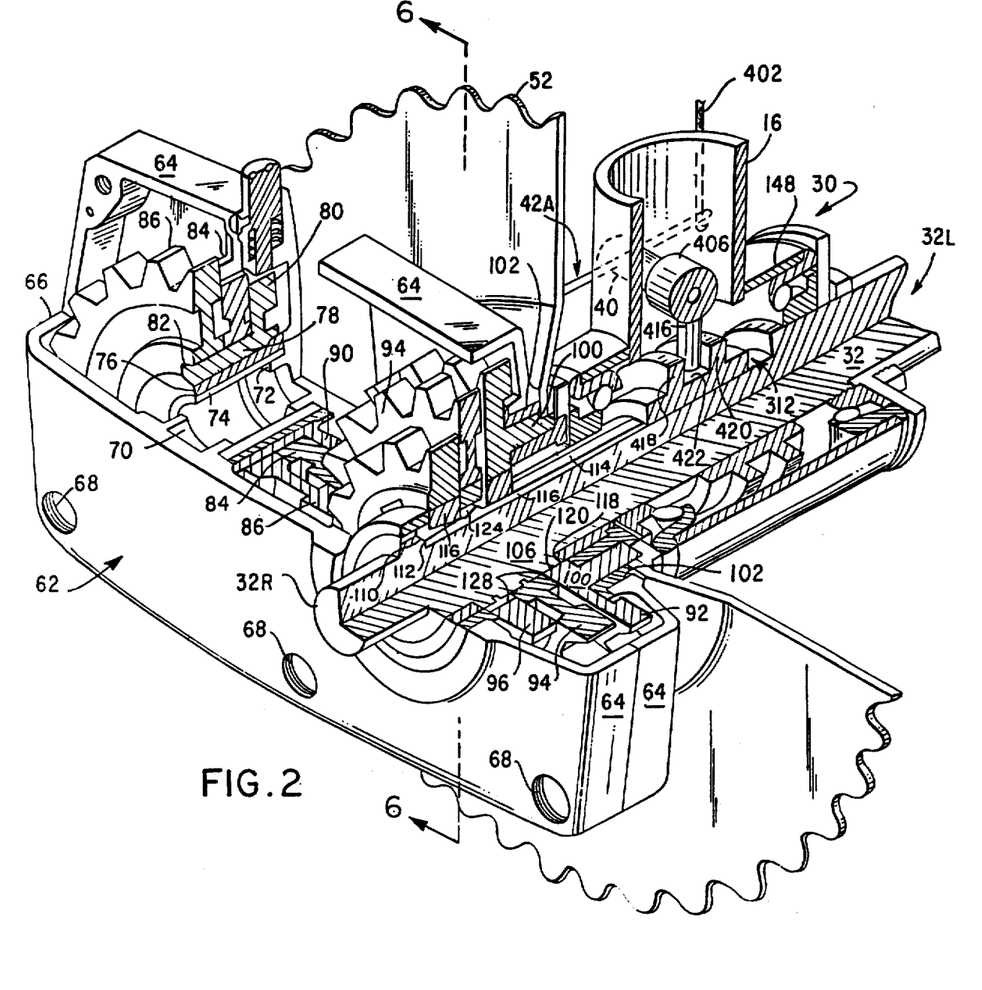
FIG. 2 is a schematic oblique view, partially cut away and sectioned, of a pedal hub located multi-speed bicycle transmission constructed in accord with the principles of this invention; and including, for the purposes of convenience and clarity of illustration and explanation, certain components that are rotationally displaced from the normal location thereof as shown in FIG. 3.
Figure 3:
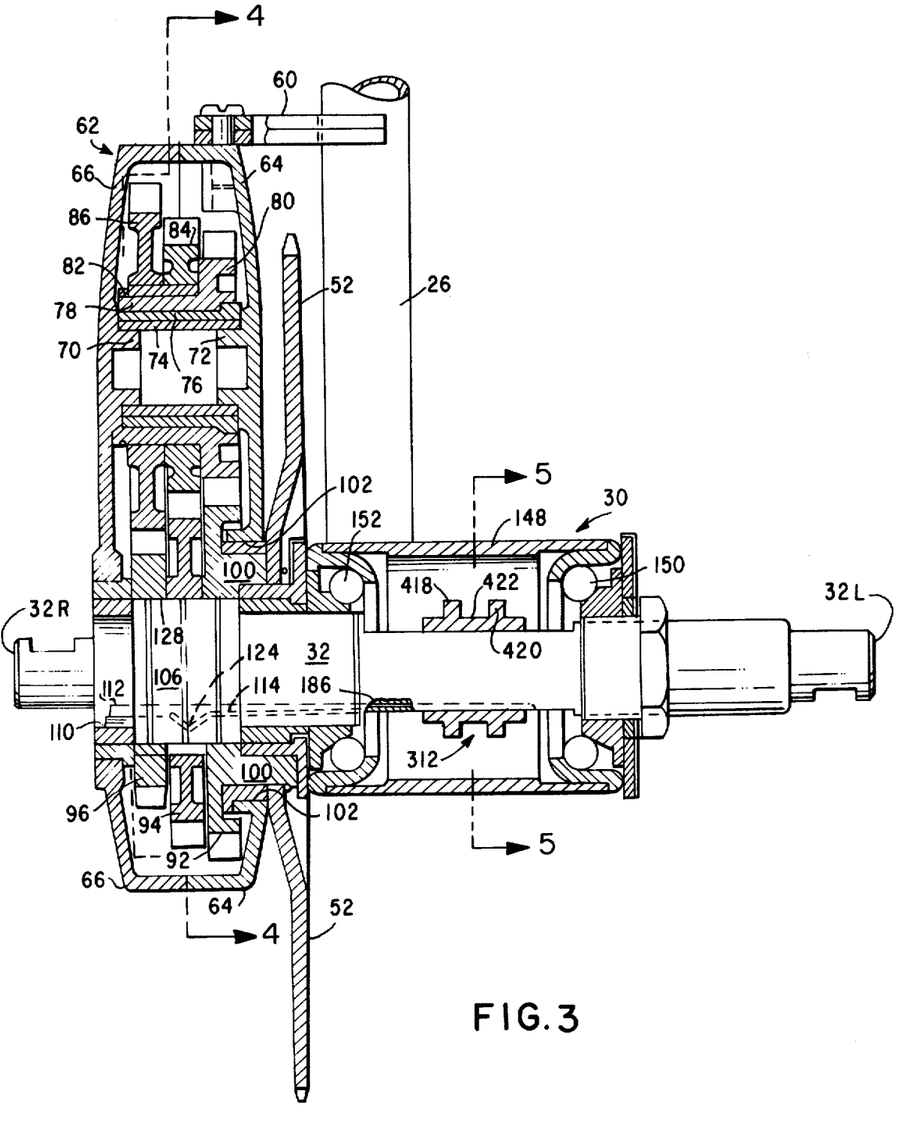
FIG. 3 is a horizontal section through the pedal hub located multi-speed bicycle transmission constructed in accord with the principles of this invention; and as taken on the line 3—3 of FIG. 4.
Figure 4:
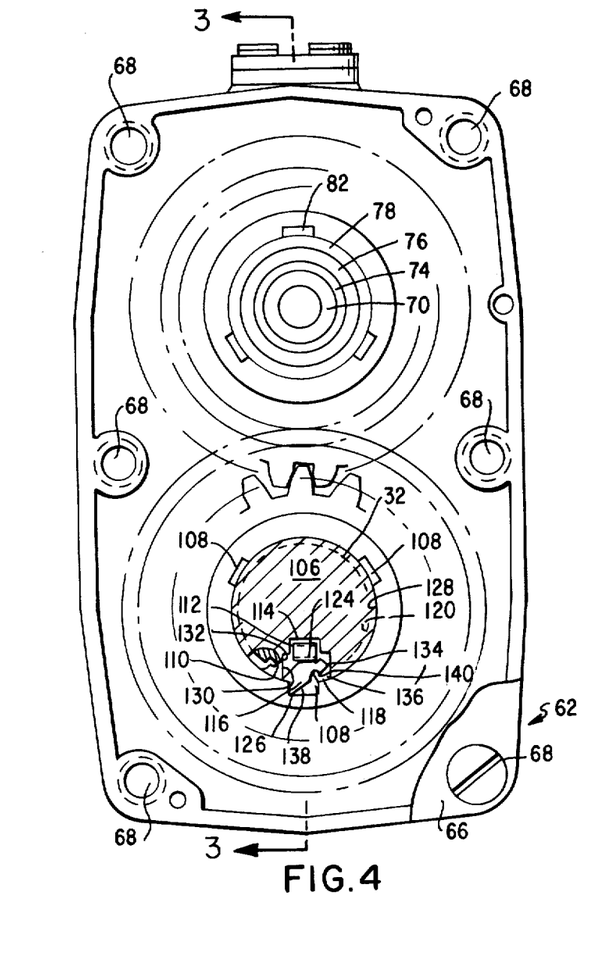
FIG. 4 is a section as taken on the line 4—4 of FIG. 3.
Figure 5:
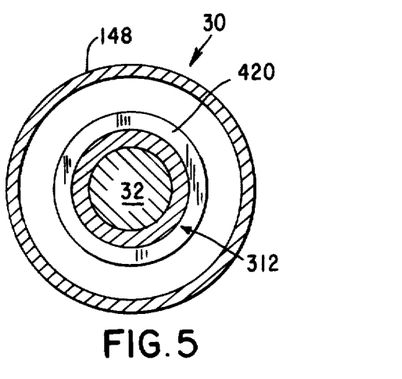
FIG. 5 is a section as taken on the line 5—5 of FIG. 3.

Referring now to FIGS. 2 through 4, and from which the right and left pedal cranks 34, 36 and pedals 38, 40 have been omitted for drawing clarity, there is provided a generally rectangular gear housing 62 disposed between the main drive sprocket 52 and the right hand terminal end 32 R of the drive pedal shaft 32. The gear housing 62 may be positioned by a U shaped bracket 60 engaging one of the rearwardly extending lower members 26 and is conveniently formed of casing halves 64 and 66 secured together by screws 68. Disposed within the gear housing 62 is a multi-element in-line transmission of the general type disclosed in said U.S. Pat. No. 3,812,735. The specifically illustrated transmission is a three speed transmission and as will be apparent to those skilled in the art, any speed multiple can be accommodated within the orbit of the disclosed invention.

More specifically, however, the casing halves 64 and 66 are internally shaped to provide a pair of inwardly directed stub axles 70, 72 that support a stationary bearing sleeve 74. Rotatably mounted on the stationary bearing sleeve 74 is a freely rotatable bearing sleeve 74 having secured thereto the cylindrical hub 78 of a first spur change gear 80. Mounted on the hub 78 of the first spur change gear 80 and splined thereto, as at 82, for concurrent rotation therewith are any desired number of additional spur change gears, as for example, the second and third spur change gears 84 and 86 for the illustrated three speed transmission. As will now be apparent, the three spur change gears 80, 84 and 86 and the bearing sleeve 76 are journalled for free but concurrent rotation about the stationary bearing sleeve 74.

Disposed in constant running meshed engagement with the three spur change gears 80, 84 and 86 respectively are three drive gears 92, 94 and 96. The drive gears 92, 94 and 96 are journalled for independent and individually free rotation about a diametrically enlarged hub portion 106 of the pedal drive shaft 32 and, as will be described hereinafter, are adapted to be disposed in individual selected driving engagement therewith. The intermost drive gear 92 is shaped to include an axially extending cylindrical flange or skirt portion 100 that is sized to extend through a suitable bore 102 in the left casing half 64 and has the main drive sprocket 52 mounted in keyed engagement thereon for rotation in conjunction therewith.

The bores 128 of the drive gears 92, 94 and 96 are sized to be rotatably supported by the enlarged hub portion 106 of the pedal drive shaft 32 and each such bore 128 includes a plurality of generally rectangular pawl engageable recesses 108 therein. As shown in FIGS. 2–4 and as also shown in enlarged form in FIGS. 6A and 6B, the enlarged hub portion 106 of the pedal drive shaft 32 includes an elongate longitudinal pawl containing outer recess 110 overlying the outwardly facing end of an inner and small elongate longitudinal channel 112 sized to extend along the pedal drive shaft 32 and adapted to contain therewithin an elongate displaceable leaf spring type actuating member 114. Disposed at the terminal end of the elongate leaf spring type actuating member 114 operatively related to the drive gears 92, 94 and 96 is an angularly shaped cam surface 124 that is normally biased radially outwardly from the axis of the pedal shaft 32 and upwardly toward and into the outer recess 110. Disposed within the outer longitudinal recess 110 are a plurality of discrete and selectively shaped drive pawl members 116, one for each of the drive gears 92, 94 and 96. Each of the pawl members 116 is normally biased downwardly within the recess 110 and out of driving engagement with the respective pawl engageable recesses 108 in the bores 128 of the drive gears 92, 94 and 96 by the action of the ring type biasing springs 118 contained within the circumferential recesses 120 in the enlarged hub portion 106.

Figure 6A:
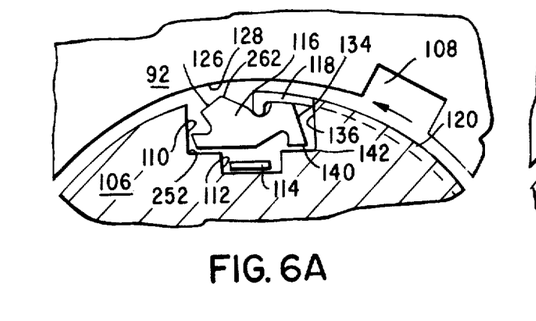
FIGS. 6A and 6B are enlarged partial sections as would be taken on the line 6—6 of FIG. 2 to illustrate the driving interconnection of the pedal shaft with the drive gears.
Figure 6B:
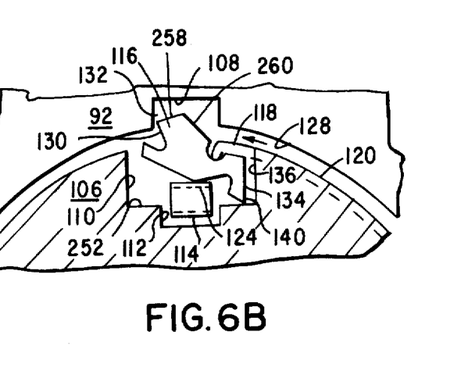
Figures 7A, 7B, 8:
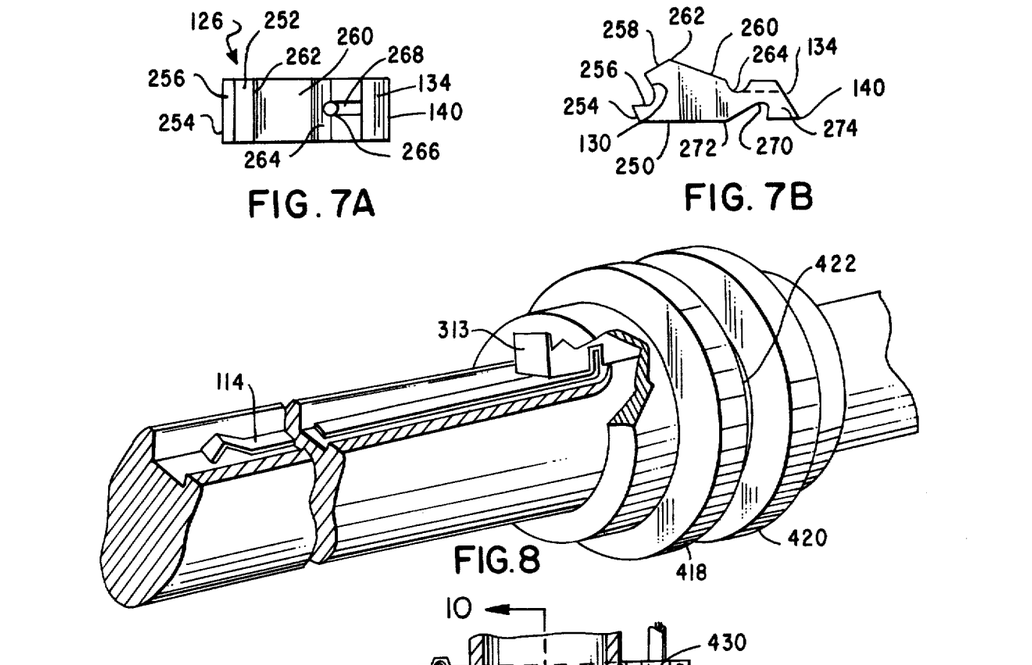
FIGS. 7A and 7B are plan and vertical sectional views respectively of the pawl members that provide the driving interconnection between the pedal drive shaft and the drive gears.
FIG. 8 is a schematic oblique view, partially cut away, of a longitudinally displaceable shift collar member as mounted on the pedal drive shaft for a manually operable shifting mechanism, which collar member is located within the pedal hub of a bicycle.

The pawl members 116 are all of similar configuration and comprise a generally rectangularly shaped block of metal of high compressive strength. As best shown in FIGS. 7A and 7B, and to a lesser extent in FIGS. 4, 6A and 6B, each pawl 116 includes a front portion 126 having a flat undersurface 250 sized to rest upon and be supported by the shoulder 252 forming the bottom of the recess 110. The front wall portion 254 includes a recess 256 and an inclined wall 130. The upper surface of the front of the pawl includes two oppositely inclined surfaces 258 and 260 having a crest 262 at their apex. Disposed at the rear of the inclined surface 260 is a transverse slot or recess 264 having a spring wire receiving dimple or bore 266 in the center thereof. Intersecting the transverse slot 264 at the bore 266 is a longitudinal channel 268 sized to accommodate the end of the spring type biasing spring 118. The undersurface of the pawl 116 includes an intermediate recess 270 defining a bearing surface 272 and a rearward heel portion 274 terminating in a pivot 140 adapted to be seated at the junction of the bottom and side defining walls of the recess 110. Extending upwardly from the pivot 140 is an inclined wall portion 134.

As will hereinafter be pointed out, the front and rear inclined walls 130 and 134 comprise the load bearing surfaces of the pawl members 116 and are disposed in substantially parallel relation to each other.

The above described pawl configuration serves to permit the ring type biasing springs 118 to normally bias the pawls 116 into seating engagement with the shoulder 252 forming the floor of the recess 110 and in bridging position over the inner channel 112. Such springs 118 also serve to maintain the pivot 140 at the apex 142 of the angle formed by the vertical wall 136 and shoulder 252 of the recess 110 and to thus permit selective pivotal and radially outward displacement of the front end portion of the pawls 116 while maintaining said pivot fixed in position.

As will now be apparent, each of the drive gears 92, 94 and 96 is freely rotatable on the enlarged hub portion 106 of the pedal drive shaft 32 and each of the pawls 116 is normally biased downwardly within the longitudinal recess 110 by the action of its respective ring type biasing spring 118. As most clearly shown in FIG. 6A, when a pawl 116 is so biased, it is out of engagement with its drive gear and there is no driving engagement between the enlarged hub portion 106 of the pedal drive shaft 32 and the drive gear associated with said pawl. Elevation of the front end 126 of a selected pawl 116 upwardly and out of the recess 110 is effected by longitudinal displacement and disposition of the elongate leaf spring type actuating member 114 within the elongate recess 112 in the pedal drive shaft 32. The selective engagement of the angularly shaped terminal end 124 thereof, due to the biasing action of said leaf spring actuating member 114, with the underside of a pawl 116, as shown in FIGS. 4 and 6B, overcomes the action of its ring type biasing spring 118 and pivotally elevates the front end 126 of the pawl 116 radially outwardly of the recess 110. Due to the interaction of the outwardly directed biasing action of the cam surface 124 on the leaf spring type actuating member 114 on the underside of a pawl 116 and the restraining action of the ring spring 118 associated therewith, a pawl is rotated about its heel 140 in the corner 142 of recess 110. Such pivotal pawl displacement places the crest 262 on the top of the pawl 116 into compressive engagement with defining surface of the bore 128 of the selected drive gear. Since the pedal drive shaft 32 will normally be rotating in the direction of the arrow in FIGS. 6A and 6B when the bicycle is being pedaled in the forward direction, the so upwardly biased pawl 116 will soon reach one of the recesses 108 and will be further upwardly displaced therein under the continued biasing action of the actuating member 114. Upon entry of the pawl 116 into a recess 108 and with continued rotation of the pedal drive shaft in the bicycle advancing direction as indicated by the arrows in FIGS. 6A and 6B, the inclined wall 130 on the front of the pawl will be disposed and maintained in compressive interfacial engagement with the wall 132 of the recess and the rear wall 134 of the pawl will be disposed in compressive interfacial engagement with the wall 136 of the recess 110. When so engaged and positioned, as illustrated in FIG. 6B, a direct driving connection is thus established between the forwardly rotating enlarged hub portion 106 of the pedal drive shaft 32 and a selected drive gear, as for example gear 92, and such driving connection will be effectively maintained, and/or readily reestablishable, until the elongate leaf spring type actuating member 114 is longitudinally displaced within the channel 112 out of engagement with the drive pawl 116 for such gear 92.

The sloped under surface 260 of the drive pawl 116 permits ready advance of the engaged drive gear relative to the drive shaft 32 as would occur when the forward rotative advance of the drive shaft 32 is halted or even reversed. Such halting of advance or reverse rotation of the pedal drive shaft 32 effects automatic disengagement of a drivingly engaged pawl from the recesses 108 in the gear bore 128 and its reintroduction into the recess 110 in the hub 110 without otherwise affecting the continued upward biasing of such pawl 116 by the action of the angularly shaped end 124 of the elongate leaf spring type actuating member 114. Such disengaging and retraction action permits the bike rider to coast with a temporary disengagement of all driving connection between the pedal drive shaft 32 and the main drive sprocket 52. The above described driving connection between an outwardly biased pawl 116 and a recess 108 in the bore 128 of the drive gear will automatically be reestablished when pedal drive shaft 32 rotation in the bicycle advancing direction is resumed by the rider.

As described above and as shown in FIGS. 4, 6A and 6B, the pawls 116 are selectively shaped to provide for parallel interfacial engagement between pawl surface 130 and sidewall 132 of recess 108 and also between pawl surface 134 and sidewall 136 of recess 110 to assure that the pawls are in compression at all times when a driving engagement exists between a drive gear and the pedal drive shaft 32.

As will now be apparent, the specifically illustrated and described set of drive and change gears is adapted to provide for three separate speed ratios for the main drive sprocket 52. For example, when the leaf spring actuating member 114 has been positioned within the longitudinal recess 112 in the pedal shaft 32 so that its cam shaped terminal end 124 elevates the pawl 116 into driving engagement with a pawl engageable recess 108 in the bore 128 of drive gear 92, the drive gear 92 will be directly driven by the rotation of the pedal drive shaft 32. At that time, the main drive sprocket 52 will be directly driven by gear 92 through its hub 100 and will be advanced at a 1 to 1 ratio with the rotation of the pedal drive shaft 32. Under such conditions, the gear 92 will also directly drive companion gear 80 which in turn will rotate change gears 84 and 86 in conjunction therewith. Change gears 84 and 86 will directly drive the freely rotatable drive gears 94 and 96, which are now unconnected to the enlarged hub 106 of pedal drive shaft 32, at speeds determined by the various gear ratios involved. If, under such conditions, the leaf spring actuating member 114 is longitudinally displaced within recess 112 out of engagement with the above mentioned pawl 116 for gear 92 and into lifting engagement with the pawl 116 associated with drive gear 94, the drive gear 92 will be disengaged from driving engagement with the pedal drive shaft 32 by retraction of the drive pawl 116 therefor into the recess 110 and the pawl 116 underlying gear 94 will be elevated into driving engagement with the pawl engageable recess 108 in the bore 128 of the drive gear 94. Under such conditions, the gear 94 will be directly driven by the rotation of the pedal drive shaft 32. In this instance, however, drive gear 94 will directly drive companion gear 84 at a speed $W_1$ rpm, determined by the gear ratios therebetween. Companion gear 84 will drive change 86 and 80 at the same speed $W_1$ rpm. Change gear 80, however, will now drive the now freely rotatable drive gear 92 at a speed $W_2$ rpm determined by the gear ratio therebetween and, of course, will thus drive the main drive sprocket 52 at the same speed $W_2$ rpm. At the same time, change gear 86 will also drive the freely rotatable drive gear 96 at a speed determined by the gear ratio therebetween. As will now be apparent, similar operation will be effected if the gear 96 is drivingly engaged with the pedal shaft 32.

The specific gear ratios for the drive and change gears may be suitably preselected to accommodate the preferences of the bicycle manufacturer.

It should also be noted, that under the above described action, at least one drive gear will always be drivingly engaged or biased for driving engagement with the pedal drive shaft 32. That is, the angularly shaped end 124 of the leaf spring actuating member 114 will always be in operative biasing engagement with at least one of the drive pawls 116.

Controlled longitudinal displacement of the elongate leaf spring actuating member 114 within the elongate channel 112 in the pedal drive shaft 32 to effect the selective driving engagement of the drive gears 92, 94 and 96 to the pedal drive shaft 32 through the above described selective elevation of the pawls 116, is effected by a manually operable shifting mechanism comprising, as noted earlier, a gear shift lever assembly 400, of conventional character connected by a sheathed cable 402 to a shifting assembly 404 all as schematically illustrated in FIG. 1.

FIGS. 8-11 disclose the elements of a presently preferred construction for effecting, in response to manual manipulation of the gear lever in the gear shift assembly 400, the controlled longitudinal displacement of the elongate leaf spring actuating member 114 within the channel 112 in the pedal drive shaft to effect the selective driving engagement of the drive gears 92, 94 and 96 by pawl elevation as described above.

The pedal drive shaft 32 is here journalled within the generally cylindrical shell 148 of the pedal hub 30 by spaced ball bearings 150,152. Terminating at or slightly below the upper surface of the pedal hub 30 is the lower end of the seat post frame member 16. Such seat post member 16 is conventionally formed of hollow tubing and is here terminally welded to a receptor aperture in the pedal hub 30, as at 302. Mounted within the terminal end of the seat post member 16, is a rotatable cylindrical member 406 having its axis disposed transverse to the longitudinal axis of the pedal shaft 32. The cylindrical member 406 includes a coaxially disposed cylindrical hub 408 which extends through the side wall of the frame member 16 and is suitably journalled therein, as at 410, to provide rotative support for the aforesaid cylindrical member 406. The cylindrical member further includes an axial bore 412 sized to receive positioning pin 414 which extends in coaxial relation through the wall of the frame member 16. The hub 408 and positioning pin 414 thus provide a pivotal mounting for the rotatable cylindrical member 406 to maintain the positioning thereof with its axis of rotation disposed perpendicular to the longitudinal axis of the pedal shaft.

Figure 9:
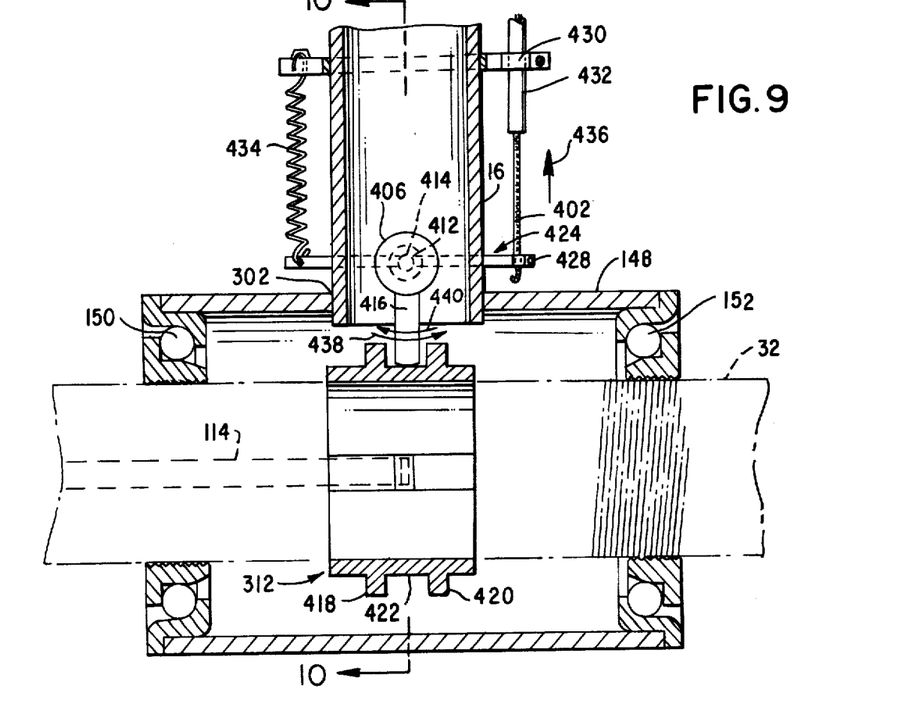
FIG. 9 is a vertical sectional view of certain of the elements of a presently preferred construction for a manually operable shifting mechanism.

Extending from the periphery of the cylindrical member 406 is an extending shaft pin 416 whose lower end is adapted to extend a predetermined distance into the pedal hub 30 and in operative relation with a shift collar member 312. As will be apparent, rotative displacement of the cylindrical member 406 through a predetermined arc will effect a concommitant arcuate displacement of the dependent end of the shift pin 416 in a plane parallel to the longitudinal axis of the pedal shaft 32.

The shift collar member 312 is mounted on the portion of the pedal drive shaft 32 disposed within the pedal hub 30 and in such manner as to be slidably displaceable therealong and rotatably displaceable in conjunction therewith. Such permitted movement, as delineated above, is readily effected by an inwardly extending key member 313 sized to be contained within the channel 112 on the pedal drive shaft 32. Secured to the collar member 312 and disposed within the elongate channel 112 is the leaf spring actuating member 114 as described in detail earlier in the specification.

The shift collar 312 includes a pair of cylindrical flanges 418 and 420 extending from the outer surface thereof and spaced apart a distance sufficient to define a channel 422 of suitable diameter and depth to accommodate the dependent end portion of the shift pin 416 therebetween. The illustrated disposition of the dependent end of the shift pin 416 within the channel permits unimpeded rotation of the shift collar 312 in conjunction with rotation of the pedal shaft 32 as well as longitudinal displacement therealong in accord with the angular positioning of the shift pin 416.

Figure 10:
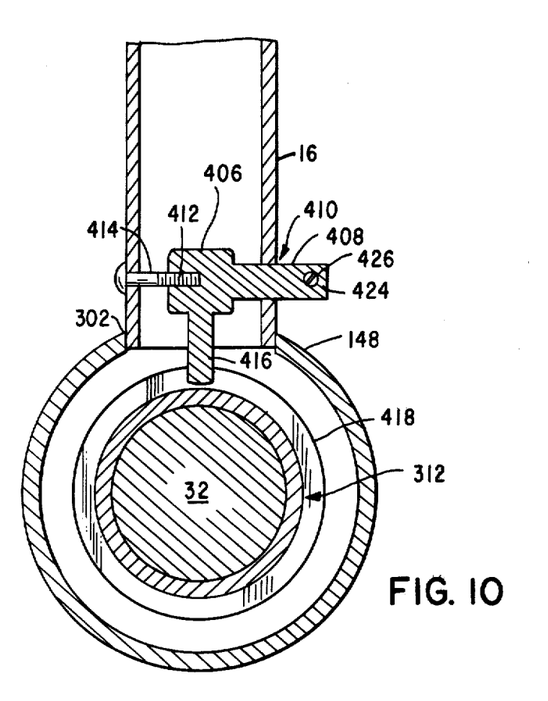
FIG. 10 is a fragmentary vertical section as taken on the line 10—10 of FIG. 9.
Figure 11:
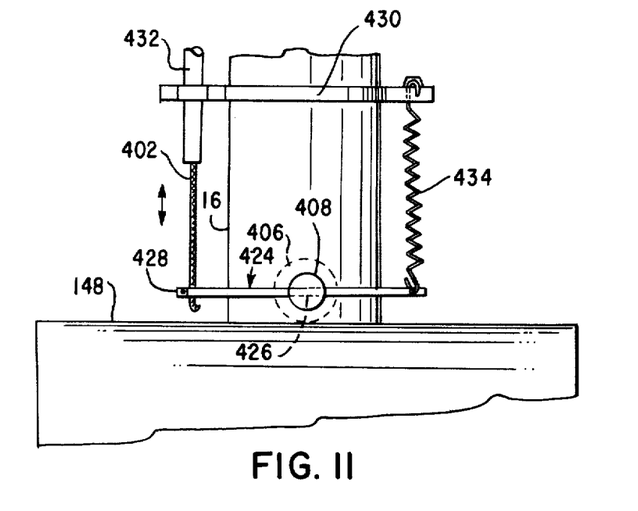
FIG. 11 is rear view of the construction shown in section in FIG. 9.

Selective rotation of the cylindrical member 406 in response to manual digital manipulation of the shift lever assembly 400 is effected by means of an extending arm 424 mounted in a transverse bore 426 in the portion of the hub 408 disposed externally of the frame member 16. One of the extending ends 428 thereof is connected to the terminal end of cable 402 which is suitably positioned in proper alignment therewith by an adjacent bracket member 430 mounted on the frame member 16 and engaging the cable sheath 432. The cable 402 may be of sufficient rigidity to permit effective bidirectional displacement of the arm 424. If desired, positive biasing of the arm 424 may be readily effected by interconnection of a biasing spring 434 between the other extending end thereof and the bracket 430.

As will now be apparent, a retraction of the cable 402 from the intermediate position illustrated in FIG. 9 and in the direction indicated by the arrow 436 will effect a counterclockwise rotation of the cylindrical member 406 and concommitant arcuate displacement of the extending shift pin 416 in the direction indicated by the arrow 438. Such arcuate displacement of the lower end of the shift pin 416 will longitudinally displace the shift collar member 312 to the right as shown in FIG. 9 with an accompanying longitudinal displacement of the leaf spring actuating member 114 from its intermediate position (where the actuating section 124 is disposed in elevating engagement with the drive pawl 116 for the intermediate drive gear 94—as shown in FIG. 2) to one of its limiting positions (where the actuating section 124 is disposed in elevating engagement with the drive pawl 116 for the drive gear 92—as shown in FIG. 2).

Similarly an advance of the cable 402 from its retracted position to and through its intermediate to an advanced position will selectively effect a clockwise rotation of the cylindrical member 406 and concommitant arcuate displacement of the extending shift pin 416 in the direction indicated by the arrow 440. Such arcuate displacement of the lower end of the shift pin 416 will effect a longitudinal displacement of the shift collar 312 and the leaf spring actuating member 114 to the left as shown in FIG. 9 and to and through their intermediate and advanced positions. As described above, disposition of the leaf spring actuating member 114 in its intermediate position will serve to position its actuating section 124 in elevating engagement with the drive pawl 116 for intermediate drive gear 94. Disposition of the leaf spring actuating member 114 in its advanced position will serve to position its actuating section 124 in elevating engagement with the drive pawl 116 for drive gear 96.

Figure 12:
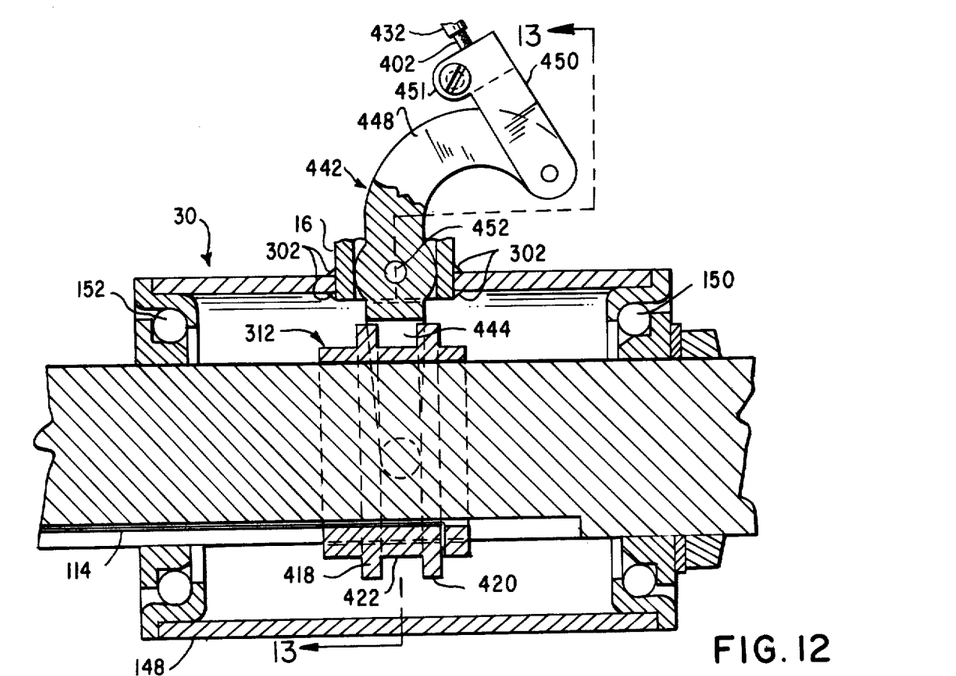
FIG. 12 is a vertical sectional view of certain of the elements of another presently preferred construction for a manually operable shifting mechanism.
Figure 13:
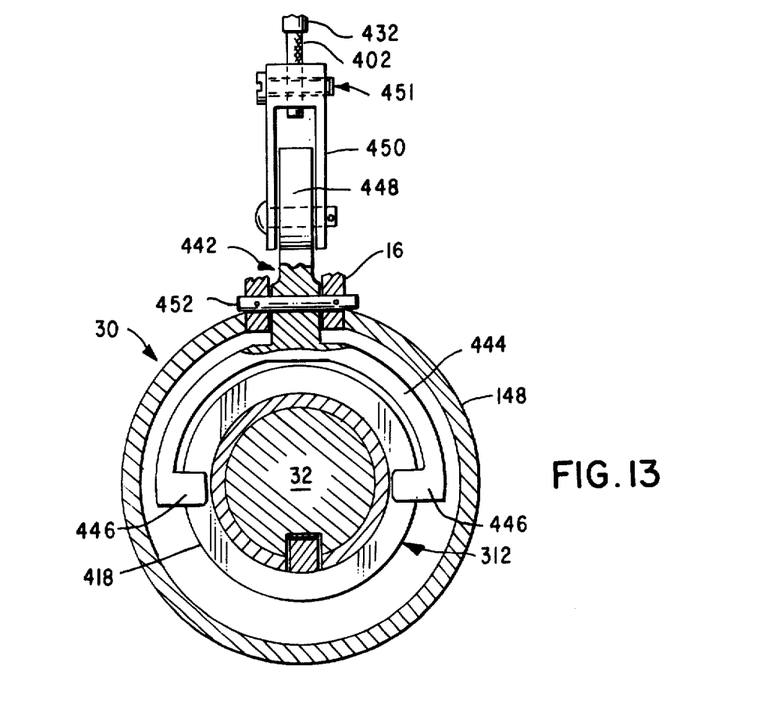
FIG. 13 is a vertical section as taken on the line 13—13 of FIG. 12.

FIGS. 12 and 13 disclose the elements of an alternate construction for effecting, in response to manual manipulation of the gear level in the gear shift assembly 400, the controlled longitudinal displacement of the elongate leaf spring actuating member 114 within the channel 112 in the pedal drive shaft to effect the selective driving engagement of the drive gears 92, 94 and 96 by pawl elevation as previously described. Like the embodiment shown in FIGS. 8-11, the pedal drive shaft 32 is journalled within the generally cylindrical shell 148 of the pedal hub 30 by spaced ball bearings 150, 152. The shift collar 312 is mounted on the portion of the pedal drive shaft 32 disposed within the pedal hub 30 and is in all pertinent structural and functional respects the same as the shift collar 312 previously referred to in FIGS. 8–11. However, contrastingly to the embodiments shown in FIGS. 8–11, slidable displacement of the shift collar 312 along the pedal drive shaft 32 is effectuated by a yoke 442 operatively connected to the terminal end of the sheathed cable 402.

The yoke 442 includes a substantially semi-circular ring 444 disposed within the cylindrical shell 148 of the pedal hub 30 and provided at each end thereof with a radially inwardly projecting boss 446. The bosses 446 ride in the channel 422 defined by the pair of shift collar cylindrical flanges 418 and 420. The yoke 442 further includes an arcuate arm 448, the lower end of which is disposed within the seat post frame member 16 and joined centrally to the semi-circular ring 444. The arcuate jam 448 is bent in a plane substantially perpendicular to the plane of the semi-circular ring 444 such that the upper end thereof extends, through a slot (not shown) in the seat post frame member 16, eternally of said member 16. Hingedly connected to the upper end of the arcuate arm 448 is a bracket 450 having a screw type clamp 451 or other clamping means to which the terminal end of the sheathed cable 402 is secured.

The lower end of the arcuate arm 448 includes a cylindrical section having a diameter approximately equal to the internal width of the seat post frame member 16, which cylindrical section is provided with an axial bore extending completely therethrough perpendicular to the plane of the arcuate arm 448 and parallel to the plane of the semi-circular ring 444. Corresponding bores are provided in the seat post frame member 16 near its joinder with the pedal hub 30, and a pin 452 is inserted through the frame member bores and the arcuate arm bore such that the entire yoke 442 is pivotable about the pin 452.

With the seat post frame member slot through which the upper end of the arcuate arm 448 extends being sized sufficiently to permit unimpeded pivoting of the arcuate arm 448 and with the inner diameter of the semi-circular ring being sized sufficiently to permit unimpeded displacement of the shift collar 312 along the pedal drive shaft 32, a retraction or advancement of the cable 402 from its intermediate position results in a corresponding longitudinal movement of the shift collar 312 along the pedal drive shaft 32 such that selective driving engagement of the drive gears 92, 94 and 96 may be effectuated.

It should be understood that the arcuate arm 448 of the yoke 442 in the embodiment shown in FIGS. 12 and 13 need not be disposed in the seat post frame member 16, but rather, may be located entirely external of said member 16 and extend into the pedal hub 30 through a separate opening therein.

The foregoing manually operable multi-speed transmission system is both rugged in nature and simple to operate and maintain and is particularly adapted for use on racing bicycles or the like. The described system is essentially fail safe in that if any pawl member biasing spring fails and permits its pawl 116 to become drivingly engaged with its related drive gear, then such gear will operatively drive the bicycle unless another and deliberately engaged drive gear happens to be one that would drive the bicycle at a higher speed. Thus, if through biasing spring failure, more than one drive gear gets drivingly engaged with the rotating pedal drive shaft 32, the drive gear that will produce the highest speed will do the driving and the other gear will be overridden due to the sloping upper surface of the drive pawls 116.

Having thus described my invention, I claim:

1. A manually actuatable multi-speed transmission for bicycles, comprising
   a pedal shaft rotatably displaceable within the pedal shaft hub of a bicycle frame,
   a plurality of drive gears rotatably mounted on said pedal shaft,
   displaceable pawl means for connecting each of said drive gears into selective driving engagement with said pedal shaft,
   collar means mounted on said pedal shaft within said pedal hub for rotation in conjunction therewith and permitted longitudinal displacement therealong,
   bidirectionally displaceable cable means manually actuatable at one end thereof by a bicycle rider,
   means engageable with said collar means and responsive to predetermined cable displacement for displacing said collar means longitudinally of said pedal shaft, and
   means responsive to the positional location of said collar means longitudinally of said pedal shaft for selectively displacing said pawl means to effect the selected connection of said drive gears into driving engagement with said pedal shaft.

2. A bicycle transmission as set forth in claim 1 including
   a pedal drive sprocket directly driven by one of said drive gears and drive chain means driven by said sprocket connectable to the rear drive whell of said bicycle.

3. A bicycle transmission as set forth in claim 1 wherein said displaceable pawl means connecting each of said drive gears into driving engagement with said pedal shaft are effectively subject to stress only during forward rotative displacement of said pedal shaft and wherein said stress is compressive.

4. A bicycle transmission as set forth in claim 1 in combination with a multi-speed transmission associated with the hub of the rear wheel of a bicycle and interconnected therewith by a drive chain.

5. A bicycle transmission as set forth in claim 3 wherein said means for effecting the selected connection of said drive gears into driving engagement with said pedal shaft comprises an elongate member having one terminal end thereof secured to said collar member and the other end thereof normally biased into lifting engagement with the underside of said pawl means.

6. A bicycle transmission as set forth in claim 1
   wherein said means engageable with said collar means and responsive to cable displacement includes one end engageable with said collar means, a second end connected to said cable and an intermediate portion pivotally mounted on a frame member in proximity to said pedal hub.

7. A bicycle transmission as set forth in claim 6 wherein said intermediate portion is pivotally mounted on a frame member interconnecting the pedal hub and the bicycle seat and the means engageable with said collar means is disposed within said frame member.

8. A bicycle transmission as set forth in claim 6
   wherein said means engageable with said collar means and responsive to cable displacement includes one end engageable with said collar means, a second end connected to said cable and an intermediate portion pivotally mounted on said pedal hub.

* * * * *